May 10, 1932.  R. ROUSSELET  1,857,874

APPARATUS FOR TAKING SAMPLES OF LIQUIDS

Filed March 29, 1929

Inventor
René Rousselet
by Wilkinson & Giusta
Attorneys.

Patented May 10, 1932

1,857,874

UNITED STATES PATENT OFFICE

RENÉ ROUSSELET, OF PARIS, FRANCE, ASSIGNOR TO COMPAGNIE POUR LA FABRICATION DES COMPTEURS ET MATERIEL D'USINES A GAZ, OF MONTROUGE-SEINE, FRANCE, A JOINT STOCK COMPANY OF FRANCE

APPARATUS FOR TAKING SAMPLES OF LIQUIDS

Application filed March 29, 1929, Serial No. 351,089, and in France April 27, 1928.

The present invention relates to a device for taking samples which is mounted on a positive meter of the wheel or rotating vane type utilized for measuring volumes of liquids flowing under no pressure head such as distillates flowing out of distilling columns.

One object of the present invention is to take samples of the liquid passing through the meter, at regular intervals, for instance, at every revolution of the meter wheel, whereby the mean composition of the liquid may be determined from analysis of the samples taken.

Fluctuations in the angular velocity of the meter wheel which is proportional to the liquid discharge therethrough, produce slight variations in the quantity of liquid taken by an ordinary sump, while, in the case of distillates, variations in the alcohol concentration modify the surface tension characteristics of the liquid so that the menisci obtained in the sample apparatus vary with said alcohol concentration thus affecting the volume of the sample taken.

A further object of the present invention is to provide means for ensuring that the volume of the sample taken shall always be constant irrespective of the speed of the meter wheel and, in the case of distillates, of the alcohol concentration of the liquid.

These and further objects of the present invention will be more fully set forth in the following description taken in conjunction with the accompanying drawings in which:—

Figure 1:
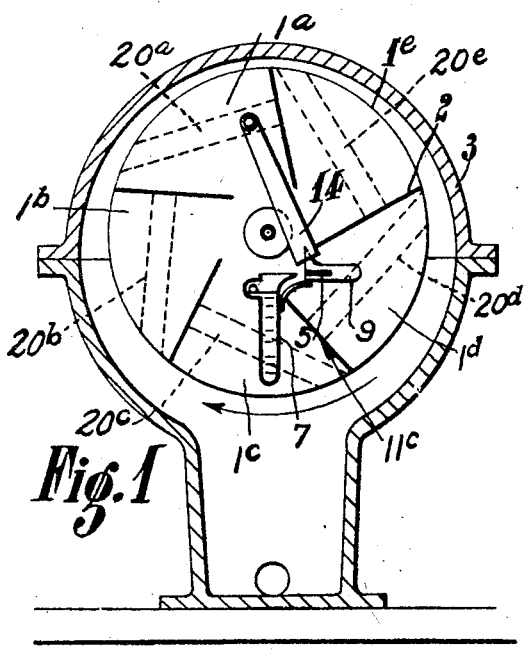
Fig. 1 is a diagrammatic section on line 1—1, Fig. 2, of a positive meter of the wheel or vane type to which is fitted the device according to the invention for taking samples.
Figure 2:
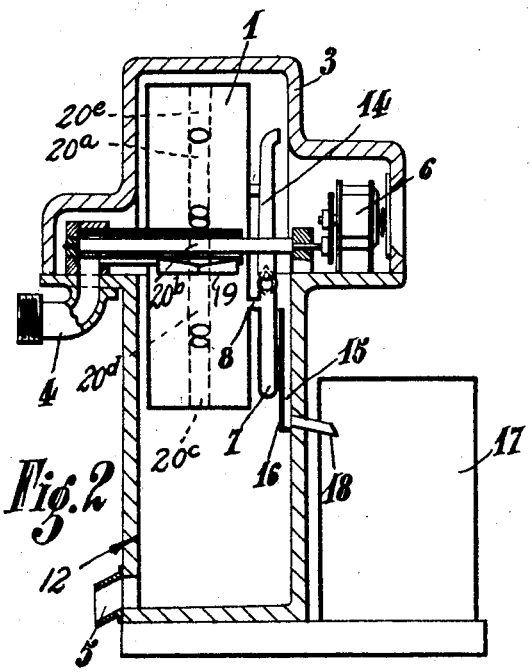
Fig. 2 is a sectional end elevation of the apparatus shown in Fig. 1.

The device for taking samples is preferably fitted to a positive meter of the rotating vane type actuated by the liquid flowing under gravity. As illustrated in Figs. 1 and 2, the meter 1 comprising a certain number of chambers, $1^a$, $1^b$, $1^c$, $1^d$ and $1^e$, partitioned off by the vanes 2, is mounted in a casing 3.

The meter has only been illustrated very diagrammatically as it is of a conventional type which does not form part of the present invention. In what follows, the case of an alcoholic liquid will be considered, but the invention is of course not limited to the use of such liquid. The liquid is admitted to the meter through the pipe 4 through which it flows under gravity and passes into the nozzle 19, falling therefrom into the chamber $1^c$. When the chamber $1^c$ is full, the liquid flows over the wall $11^c$ separating said chamber $1^c$ from the adjacent chamber $1^d$. The liquid then passes into the chamber $1^d$ and the equilibrium of the meter is thus detroyed, so that it is suddenly jerked into the position in which the chamber $1^d$ takes the place of the chamber $1^c$ on the vertical axis of the apparatus.

The liquid contained in the chamber $1^c$ flows out into the tank 12 through an open tube $20^d$ which is mounted at one end in the wall $11^c$ of the chamber $1^c$ and at the other end in the cylindrical wall of the meter 1, holes being drilled in said two walls to receive the tube $20^d$ so that the liquid flows through the wall $11^c$ into the tube $20^d$ and out into the tank 12 through the cylindrical wall of the meter 1. It will be understood that each chamber is provided with a similar tube which passes through the chamber without communicating therewith but communicating with the adjacent chamber through the separating wall between them. The revolutions of the meter are totalized by means of the clock-work mechanism comprehensively designated by 6.

The device according to the invention for taking samples comprises a tube 7 secured to and communicating with the chamber 1ᶜ of the wheel 1 through a duct 8.

The bottom of the tube 7 is rounded to facilitate drainage of the liquid. With the wheel 1 rotating in the direction of the arrow (Figs. 1, 3, and 4), the tube 7 pours out the liquid it contains into a sample bottle 9 when the wheel 1 is in the position shown in Fig. 3. The bottle 9 is situate approximately at 90° to the tube 7 and its capacity is less than that of said tube. Hence, if the bottle 9 is designed to have a capacity equal to the constant volume of the sample which it is desired to draw off, the volume of liquid contained in the tube 7 before the latter starts pouring into the bottle 9 will always be greater than the capacity of said bottle, whatever influences may be at work to vary said volume, so that the bottle 9 will always be filled to overflowing.

In order to eliminate variations in the height of the meniscus caused by variations in the alcohol content of the liquid, one or more rods 5 are soldered or otherwise secured to the outside of the bottle 9 parallel to the longitudinal axis thereof and with their upper ends flush with the upper edge of the bottle. The action of said rods 5 is to reduce the meniscus by capillary attraction.

The action of the rods 5 is probably best explained as follows: When the tube 7 discharges into the sample bottle 9, a meniscus will be formed both on the rod or rods 5 and on the sample bottle 9 and the change in curvature at the joining point of the two menisci will destroy the equilibrium of the liquid so that the meniscus on the bottle, which is of course greater than that on the rod, will be reduced by the rod.

Any other suitable meniscus absorbing device may be used. Thus, in Figs. 5 and 6, the bottle 9a has a rounded upper edge 10 on which a thin film of liquid forms and the meniscus is reduced substantially in the manner previously explained.

Figures 5, 7, 8, 10:
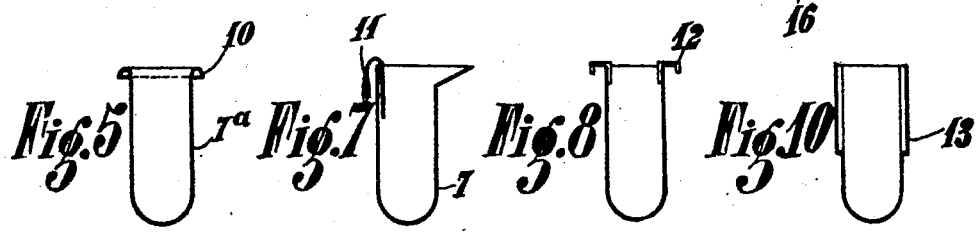
Figs. 5 and 6 illustrate a modified form of sample bottle in sectional elevation and plan respectively.
Fig. 7 illustrates a sample bottle provided with a wick for resorbing the meniscus.
Figs. 8 and 9 are sectional elevation and plan views respectively of a sample bottle provided with nails for sucking up the meniscus.
Figs. 10 and 11 are sectional elevation and plan views respectively of a further modified form of sample bottle.
Figure 6:

Fig. 7 illustrates a wick 11 which straddles the edge of the sample bottle 7 and reduces the meniscus. A clip member 21 secured to the bottle 7 holds the wick 11 in place.

Figures 9, 11:

As shown in Figs. 8 and 9, the wick 11 may be replaced by nails 12 soldered to or secured in any other suitable manner to the sample bottle. Finally in Figs. 10 and 11, the problem of reducing the meniscus has been solved by channeling the wall of the sample bottle as at 13.

Figure 4:
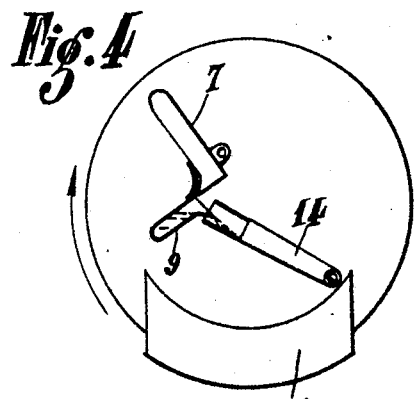
Fig. 4 is a fragmentary view of the sample device illustrating the funnel in position for discharging to the sample box.

On the wheel 1 is likewise mounted a funnel 14 which is so situated with respect to the bottle 9 that the latter, after having been filled by the tube 7 and on further rotation of the wheel 1, pours its contents into said funnel 14. The other end of the funnel 14 is likewise open and is adapted to rotate past a pocket 15 formed between the wall of the casing 3 and a plate 16 bent round at its lower end and connected to the casing 3. As shown in Fig. 4, the upper edge of said plate 16 may be of arcuate shape. Thus, as the sample bottle 9 pours liquid into the funnel 14, the liquid flows through the latter and out into the pocket 15 from which it passes into the sample box 17 through the offtake 18.

The outlet end of the funnel 14 will be carefully rounded to ensure proper drainage of the liquid therefrom.

Figure 3:
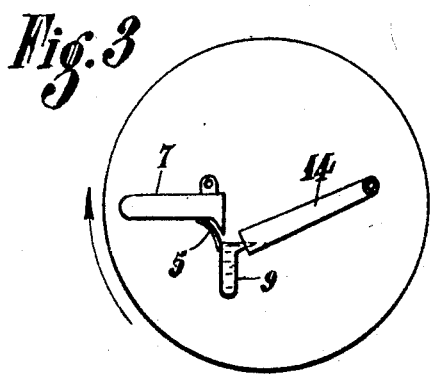
Fig. 3 is a fragmentary view of the sample device illustrating the sample bottle in position for being filled.

The device operates in the following manner:—Assuming the wheel to be in the position of Fig. 1, the meter will discharge part of its liquid to the tube 7 through the duct 8. Partial rotation of the wheel 1 due to the action of the water filling its compartments, will then bring the sample bottle 9 into the vertical position as shown in Fig. 3. During the interval before the next rotation of the wheel 1, the tube 7 will discharge into the sample bottle 9 and the meniscus formed on the surface of the liquid in said bottle will be reduced by any one of the devices previously described.

Another partial revolution of the wheel 1 then brings the apparatus into the position shown in Fig. 4. The wheel 1 is then again stationary whilst another compartment fills up and the sample tube 9 discharges liquid into the funnel 14 which delivers the liquid into the pocket 15, from whence said liquid flows into the sample box 17. Upon further rotation of the wheel 1, the tube 7 will return to the position illustrated in Fig. 1 and the cycle of operations will start again.

It will have been gathered from the above that a sample of the liquid is taken at each complete revolution of the wheel so that for $n$ revolutions of the wheel, $n$ values can be obtained from which the mean composition of the liquid can be deduced. Obviously, the more samples are taken the more accurately will the mean composition of the liquid be ascertained and instead of taking one sample per revolution of the wheel several might be taken, for instance, as many as there are vanes 2 in the wheel 1.

I claim:

1. In a device of the character described, the combination with a rotating member for metering liquid flowing therethrough, of a container mounted on said member to rotate therewith, said container, the capacity of which is greater than the volume of the sample to be taken, receiving liquid from said member at a predetermined angular position thereof; and a receptacle of capacity equal to the volume of the sample, mounted in spaced relation to said container and rotating therewith, said container pouring liquid into said receptacle after a predetermined rotation of said member.

2. In a device for taking samples of liquid, the combination with a meter including an intermittently rotating member for metering liquid flowing therethrough, of a container mounted on said member to rotate therewith, said container, the capacity of which is greater than the volume of the sample to be taken, receiving liquid from said member at a predetermined angular position thereof; a receptacle of capacity equal to the volume of the sample, mounted in spaced relation to said container and rotating therewith, said container pouring liquid into said receptacle after a predetermined rotation of said member; and means for reducing the meniscus of the liquid poured into said receptacle.

3. In a device for taking samples of liquid, the combination with a meter of the character described and including an intermittently rotating member for metering liquid flowing therethrough, of a container mounted on said member to rotate therewith, said container, the capacity of which is greater than the volume of the sample to be taken, receiving liquid from said member at a predetermined angular position thereof; a receptacle of capacity equal to the volume of the sample, mounted in spaced relation to said container and rotating therewith, said container pouring liquid into said receptacle after a predetermined rotation of said member; a box for collecting the samples taken; a funnel mounted in spaced relation to said receptacle and rotating therewith, said receptacle discharging its liquid to said funnel after further rotation of said member, and means through the medium of which said funnel conveys said liquid to said sample box.

4. In a device for taking samples of liquid, the combination with a meter including an intermittently rotating member for metering liquid flowing therethrough, of a container mounted on said member to rotate therewith, said container, the capacity of which is greater than the volume of the sample to be taken, receiving liquid from said member at a predetermined angular position thereof; a receptacle of capacity equal to the volume of the sample, mounted in spaced relation to said container and rotating therewith, said container pouring liquid into said receptacle after a predetermned rotation of said member; means for reducing the meniscus of the liquid poured into said receptacle; a box for collecting the samples taken; a funnel mounted in spaced relation to said receptacle and rotating therewith, said receptacle discharging its liquid to said funnel after further rotation of said member, and means through the medium of which said funnel conveys said liquid to said sample box.

5. A device for taking samples of liquid according to claim 2, wherein the means for reducing the meniscus of the liquid poured into said receptacle consist of rods mounted on the outside of said receptacle with their upper ends flush with the edge of said receptacle.

RENÉ ROUSSELET.